US008635178B2

(12) United States Patent
Jolfaei

(10) Patent No.: US 8,635,178 B2
(45) Date of Patent: Jan. 21, 2014

(54) RULE-BASED PROCESSING IN DIFFERENT LAYERS

(75) Inventor: Masoud Aghadavoodi Jolfaei, Wiesloch (DE)

(73) Assignee: SAP AG, Walldorf (DE)

( * ) Notice: Subject to any disclaimer, the term of this patent is extended or adjusted under 35 U.S.C. 154(b) by 506 days.

(21) Appl. No.: 12/643,799

(22) Filed: Dec. 21, 2009

(65) Prior Publication Data

US 2011/0153538 A1 Jun. 23, 2011

(51) Int. Cl.
*G06F 17/00* (2006.01)
*G06N 5/02* (2006.01)

(52) U.S. Cl.
USPC .......................................................... 706/47

(58) Field of Classification Search
USPC .......................................................... 706/47
See application file for complete search history.

(56) References Cited

U.S. PATENT DOCUMENTS

| | | | |
|---|---|---|---|
| 6,983,288 B1* | 1/2006 | Kirkwood et al. ..................... | 1/1 |
| 2007/0294056 A1* | 12/2007 | Maskall et al. ............... | 702/186 |
| 2010/0125477 A1* | 5/2010 | Mousseau et al. ................ | 705/7 |

OTHER PUBLICATIONS

Oracle Application Server 10g R3: Overview of New Features An Oracle White Paper Updated Dec. 2008.*
"Business rules engine", http://en.wikipedia.org/wiki/Business_rules_engine, [Online]. Retrieved from the Internet:, (Oct. 16, 2009), 3 pgs.
"Rule-based system", http://en.wikipedia.org/wiki/Rule-based_system, [Online]. Retrieved from the Internet:, (Oct. 16, 2009), 2 pgs.
"Runlevel", http://en.wikipedia.org/wiki/Runlevel, [Online]. Retrieved from the Internet:, (Oct. 16, 2009), 7 pgs.
Mahmoud, Qusay H, "Getting Started With the Java Rule Engine API (JSR 94): Toward Rule-Based Applications", http://java.sun.com/developer/technicalArticles/J2SE/JavaRule.html, [Online]. Retrieved from the Internet:, (Jul. 26, 2005), 11 pgs.
Peuschel, Burkhard, et al., "Concepts and implementation of a rule-based process engine", *Proceedings of the 14th international conference on Software engineering*, (1992), 262-279.
Porras, P. A, et al., "Penetration state transition analysis: A rule-based intrusiondetection approach", *Eighth Annual Computer Security Applications Conference, 1992. Proceedings.*, (1992), 220-229.

* cited by examiner

*Primary Examiner* — Kakali Chaki
*Assistant Examiner* — Ababacar Seck
(74) *Attorney, Agent, or Firm* — Schwegman Lundberg & Woessner, P.A.

(57) ABSTRACT

In an embodiment, a method is provided for processing rules within a layer of an application. In this method, a rule defining a condition and a functionality associated with the condition is received at runtime of the layer. This functionality is provided by the layer. Using a microprocessor, a fulfillment of the condition is identified and the functionality is executed based on this identification.

20 Claims, 9 Drawing Sheets

RULE-BASED PROCESSING IN DIFFERENT LAYERS

FIELD

The present disclosure relates generally to rule-based systems. In an embodiment, the disclosure relates to rule-based processing in different layers.

BACKGROUND

Software and hardware components can often have errors that produce incorrect or unexpected results, or cause the components to behave in unintended ways. Debugging is a process of finding and correcting the errors, and currently, a large number of diagnostic applications may be used to "debug" errors. For example, dedicated traces and/or logging extensions may be deployed within a system for use in extracting more information about particular errors. This information can then be used to fix the errors. Often, these dedicated traces and logging extensions are deployed using a software patch, which is a piece of software designed specifically to update a software application or its supporting data. However, the use of software patches can be troublesome because it takes time to download and apply the patches. Furthermore, the patches themselves can cause additional errors especially when the patches are incorrectly applied.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for processing rules in different layers. Here, a rule-based engine is tightly integrated within a layer of an application, such as an application server layer, an operating system layer, and/or a virtual machine layer. As a result of this integration, the rule-based engine can access functionalities provided by the layer at runtime. As explained in more detail below, the functionalities can be triggered and controlled based on rules provided to the rule-based engine.

Figure 1:
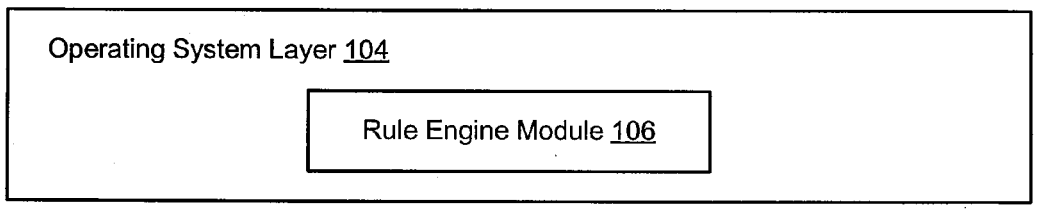
FIG. 1 depicts a block diagram of an architectural overview of a rule engine module, in accordance with an embodiment, that is adapted to process rules within an operating system layer.

FIG. 1 depicts a block diagram of an architectural overview of a rule engine module 106, in accordance with an embodiment, that is adapted to process rules within an operating system layer 104. Generally, the operating system layer 104, which is embodied in a computing device, is adapted to run other program applications. Additionally, the operating system layer 104 manages both software and hardware resources. For example, the operating system layer 104 may direct operations of the computing device, control and schedule execution of other program applications, and manage storage, input/output, and communication of resources (e.g., management of thread execution and of memory resources). In this embodiment, the operating system layer 104 includes a rule engine module 106 that is adapted to process rules. A "rule," for example, may refer to a conditional statement that specifies execution of one or more functionalities in response to a fulfillment of the condition. Rules, for example, include a condition and a functionality to be executed based on the fulfillment of the condition. For example, a rule may include an "if" part representing the condition and a "then" part representing a function to be executed when the "if" part is true. In another example, a rule may include an "if not" part representing the condition and a "then" part representing a function to be executed when the "if not" part is true. It should be appreciated that a rule may, in one embodiment, based on language that is different from a language used to build or program the underlying layer, which is described below.

In the embodiment depicted in FIG. 1, the rule engine module 106 is integrated or embedded within the operating system layer 104. That is, the operating system layer 104 does not run or manage the rule engine module 106. Rather, the rule engine module 106 is a part of the operating system layer 104. A "layer," in one example, may refer to one or more programs or hardware that embody a particular software and/or hardware functionality or system, such as an operating system (or operating system layer 104). That is, a layer can be a framework that embodies a particular software and/or hardware functionality or system. For example, a layer may refer to an application or hardware itself. In another example, a layer may refer to a set of applications and/or hardware that provides a particular functionality.

It should be appreciated that an operating system layer 104 itself may be comprised of individual modules, and the rule engine module 106 may be integrated within one or more of these modules. Examples of such modules include a hardware abstraction module, a system interface or kernel module, a file system module, a driver module, and an application programming interface module.

As a result of the rule engine module 106 being integrated within the operating system layer 104, the rule engine module 106 has access to and can execute functionalities that are provided by the operating system layer 104. That is, the rule engine module 106, in this embodiment, can consume and control the functionalities provided by the operating system layer 104. Examples of such functionalities that are provided by the operating system layer 104 include creation of processes or threads, allocation of memory resources, connections to sockets, opening of Transmission Control Protocol (TCP)/Internet Protocol(IP) connections, and other functionalities provided by the operating system layer 104. As described in more detail below, the operating system layer 104 or other layers may provide its functionalities through application programming interfaces.

It should be appreciated that in other embodiments, the rule engine module 106 may include fewer, more, or different modules apart from those shown in FIG. 1. For example, in other embodiments, the rule engine module 106 may be comprised of a sub-module that loads or receives rules and another sub-module that executes rules.

Figure 2:
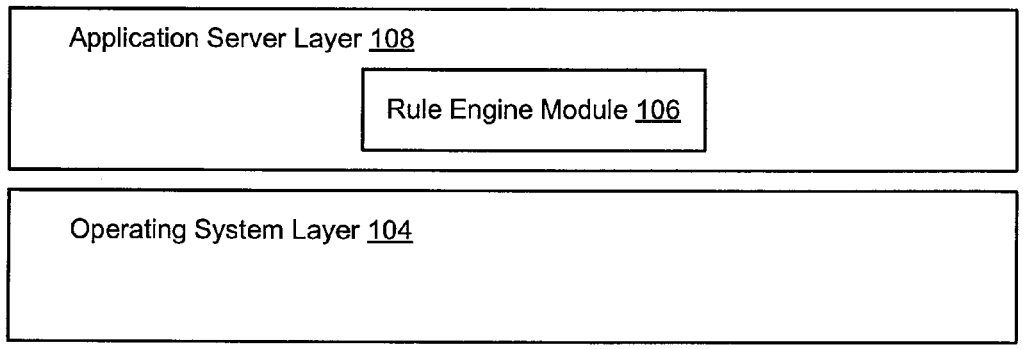
FIG. 2 depicts a block diagram of an architectural overview of the rule engine module, in accordance with another embodiment, that is integrated within an application server layer.

FIG. 2 depicts a block diagram of an architectural overview of the rule engine module 106, in accordance with another embodiment, that is integrated within an application server layer 108. As depicted, the application server layer 108 runs on top of the operating system layer 105. The application server layer 108 may refer to a software layer that delivers functionalities to clients. The application server layer 108 may handle, for example, business logic and data access operations. In one example, the application server layer 108 is adapted to host or execute a set of applications accessible by clients in communication with the application server layer 108 through application programming interfaces. Examples of the application server layer 108 include a JAVA application server (e.g., Java Platform, Enterprise Edition application server), an Apache server, an Advanced Business Application Programming (ABAP) Application Server, and an Internet Information Server (IIS).

In the embodiment depicted in FIG. 2, the rule engine module 106 is integrated within the application server layer 108. It should be appreciated that the application server layer 108 itself may be comprised of individual modules, and the rule engine module 106 may be integrated within one or more of these modules. Examples of such modules include a dispatcher module, a gateway module, and a work process module.

As a result of the integration, the rule engine module 106 has access to and can execute functionalities that are provided by the application server layer 108. Examples of such functionalities that are provided by the application server layer 108 include activation and deactivation of diagnostic tools, authentication, authorization, session management, transaction management, cache infrastructure management, and other functionalities provided by the application server layer 108.

Figure 3:
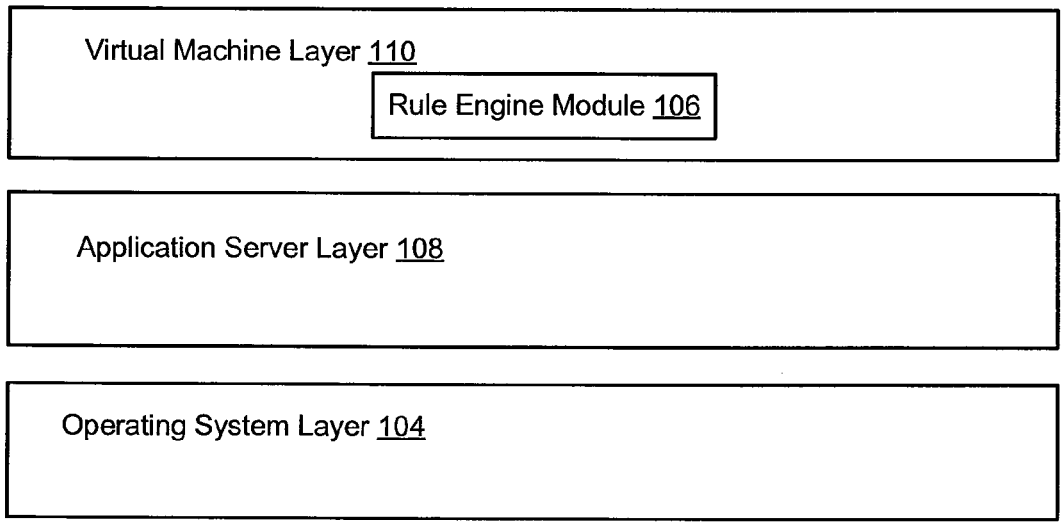
FIG. 3 depicts a block diagram of an architectural overview of the rule engine module, in accordance with yet another embodiment, that is integrated within a virtual machine layer, in accordance with yet another embodiment.

FIG. 3 depicts a block diagram of an architectural overview of the rule engine module 106, in accordance with yet another embodiment, that is integrated within a virtual machine layer 110, in accordance with yet another embodiment. As depicted, the virtual machine layer 110 may run on top of the application server layer 108, which in turn runs on top of the operating system layer 104. The virtual machine layer 110 refers to a runtime environment where commands or languages are interpreted. In general, the virtual machine layer 110 provides a high-level abstraction of a programming language, such as JAVA, ABAP, and C++, and is implemented using an interpreter. With the interpreter, the virtual machine layer 110 is adapted to interpret, for example, binary code for execution by one or more processors. For example, the virtual machine layer 110 may be a JAVA virtual machine where JAVA commands are interpreted. Generally, the JAVA virtual machine interprets bytecode and abstracts use of resources for the bytecode. Other examples of the virtual machine layer 110 include the ABAP language interpreter and C/C++ interpreters.

In the embodiment depicted in FIG. 3, the rule engine module 106 is integrated within the virtual machine layer 110. It should be appreciated that the virtual machine layer 110 itself may be comprised of individual modules, and the rule engine module 106 may be integrated within one or more of these modules. Examples of such modules include a diagnostic module, a memory management module, a class loader module, and an interpreter module.

As a result of this integration, the rule engine module 106 has access to and can execute functionalities that are provided by the virtual machine layer 110. Examples of such functionalities that are provided by the virtual machine layer 110 include language dependent functionalities (e.g., security), file handling functionalities, execution of modules, tracing functionalities, logging functionalities, debugging functionalities, memory management capabilities, interactions with databases, transaction and communication management, parallel processing of modules, and other functionalities provided by the virtual machine layer 110.

Figure 4:
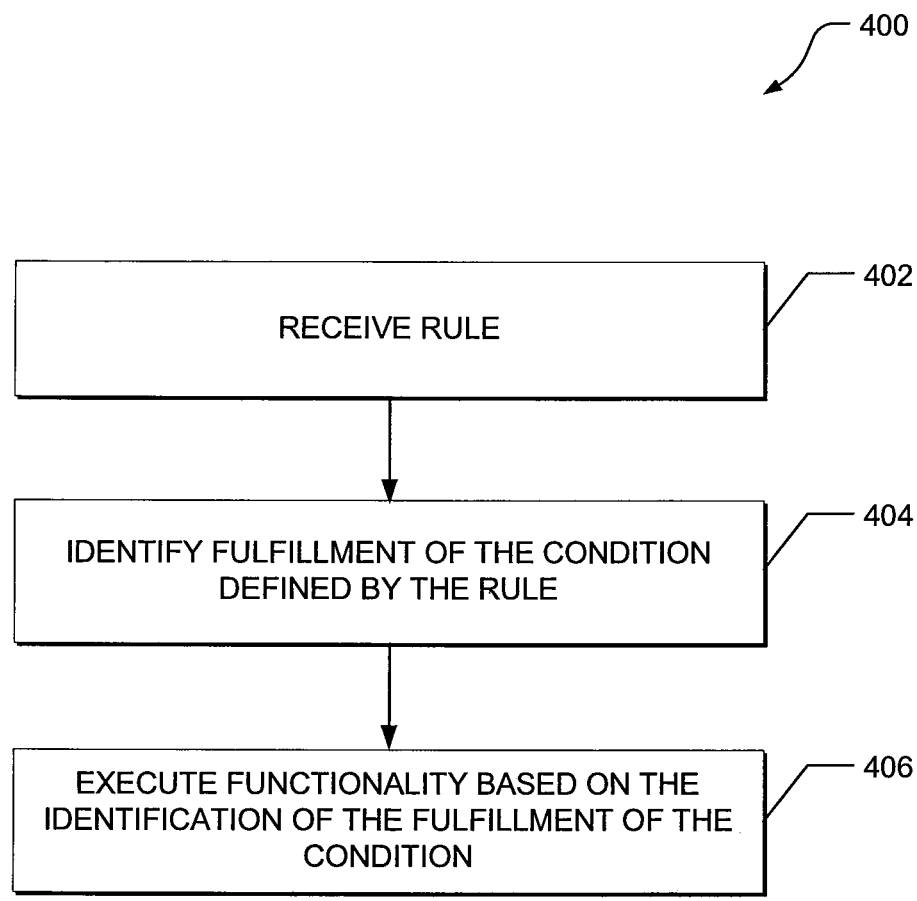
FIG. 4 depicts a flow diagram of a general overview of a method, in accordance with an embodiment, for processing rules within a layer.

FIG. 4 depicts a flow diagram of a general overview of a method 400, in accordance with an embodiment, for processing rules within a layer at runtime. The method 400 may be implemented by the various embodiments of the rule engine module 106 depicted in FIGS. 1, 2, and 3. As depicted in FIG. 4, within a layer of an application (e.g., an application server layer, an operating system layer, and/or a virtual machine layer), the rule engine module at 402 receives one or more rules at runtime of the layer. As discussed above, a rule may define one or more conditions and one or more functionalities associated with the fulfillment of the conditions.

With receipt of a rule, the rule engine module at 404 identifies satisfaction or fulfillment of a condition defined by the rule. In one embodiment, the condition can be fulfilled based on the occurrence of one or more specific events. An "event," in one example, may refer to an occurrence or happening of significance to a task or program application. Examples of events include a completion of an input/output operation, a program error that indicates a significant problem, a completion of a successful operation of an application, driver, or service, receipt of a particular message, and other events. For example, a rule may define a condition based on the occurrence of a specific event (e.g., "if" event). The condition is deemed fulfilled upon identification of the occurrence of this event. In one embodiment, the identification of the occurrence of the event can be made by detecting the occurrence of the event. In an alternate embodiment, the identification can be made by receiving messages or other notifications that indicate the occurrence of the event.

In another embodiment, the condition can be fulfilled based on the non-occurrence of one or more specific events. For example, a rule may define a condition based on the non-occurrence or absence of a specific event (e.g., "if not" event). The condition is deemed fulfilled upon identification of the absence of the particular event. Similarly, in one embodiment, the identification of the non-occurrence of the event can be made by detecting a non-occurrence of this event. In an alternate embodiment, the identification can be made by, for example, not receiving messages or other notifications that indicate the occurrence of the event.

Upon identification of the fulfillment of the condition, the rule engine module executes at 406 one or more functionalities associated with the condition, as defined by the rule. As discussed above, depending on where the rule engine module is integrated, the functionalities can be provided by, for example, the operating system layer, the application server layer, and/or the virtual machine layer. The execution of a functionality may include, for example, activating a particular functionality. It should be appreciated that in addition to functionalities based on the type of layer, the rules may also define functionalities provided by the rule engine module itself. For example, such a functionality may include the triggering the execution of other rules received by the rule engine module.

Given that a rule engine module can be dynamically updated with new or updated rules, the rule engine module may provide a flexible infrastructure that can adapt to system changes. For example, rather than to develop a new software patch to diagnose an error in a particular software application, a new rule can be provided to the rule engine module at runtime that provides diagnostic functionalities without modifying the particular software application.

Figure 5:
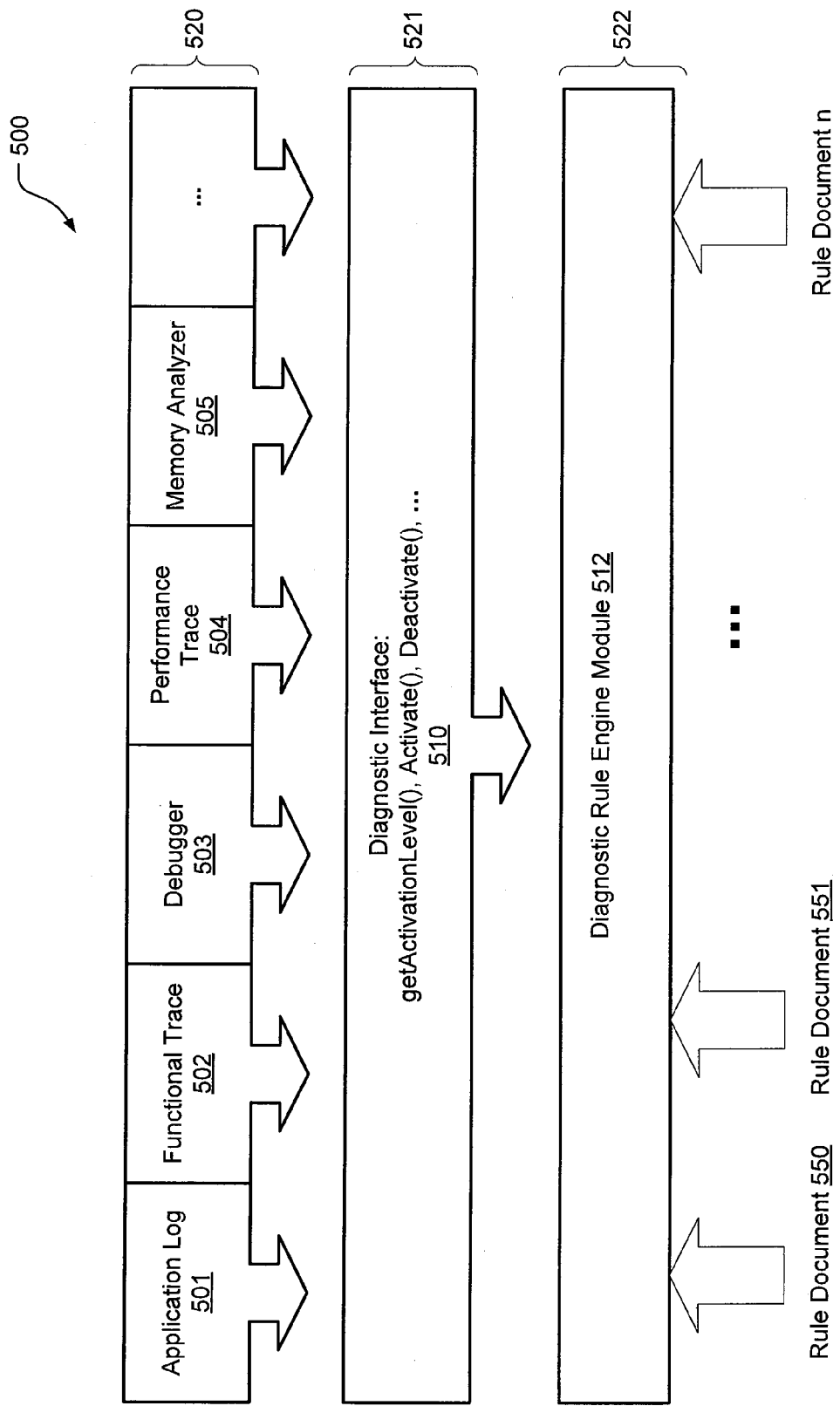
FIG. 5 depicts a block diagram of an architectural overview of a rule engine module embodied in a diagnostic-based system, in accordance with an embodiment.

FIG. 5 depicts a block diagram of an architectural overview of a rule engine module embodied in a diagnostic-based system 500, in accordance with an embodiment. The diagnostic-based system 500 provides a three-tiered layering, which includes a component layer 520, an interface layer 521, and a rule-based layer 522. This diagnostic-based system 500 may be embodied within, for example, an application server layer or a virtual machine layer.

It should be appreciated that defects or faults may exist in software or hardware components. The diagnostic-based system 500 is an infrastructure that provides various functionalities for troubleshooting or diagnosing these components. As a result, users may troubleshoot components by accessing the various diagnostic functionalities provided by an application server layer or a virtual machine layer through an application programming interface, such as the diagnostic interface 510 included in the interface layer 521.

With the diagnostic-based system 500, a user can diagnose any suitable software and/or hardware error by activating diagnostic tools 501-505 used for diagnosing components. These diagnostic tools 501-505 are applications that provide functionalities for use in diagnosing and resolving hardware and/or software problems. An example of a diagnostic tool is a debugger 503, which is an application used to test and debug software and/or hardware components. The debugger 503 may, for example, provide a display of the contents of a computer memory, including source code and variables. Another example of a diagnostic tool is a memory analyzer 505 that can analyze or check allocated memories during execution. Yet other examples of diagnostic tools are functional and performance tracing tools 502 and 504, respectively, that provide functionalities such as measuring execution (e.g., consumed time for execution of modules), tracing the execution path of an application, and performing class trace generation. In particular, the functional trace 502 dumps or provides information regarding the execution of certain functionalities in, for example, an operating system layer or an ABAP application server. The performance trace 504 delivers information regarding time consumption or measurements during execution. Other examples of diagnostic tools include application log 501, network route tracers, security monitors, performance monitors, configuration monitors, and other diagnostic tools. In one embodiment, the diagnostic tools 501-505 may be plug-in applications, which are computer programs that interact with a host application to provide certain functionalities (e.g. diagnostic functionalities).

The interface layer 521 includes a diagnostic interface 510, which is a component-specific interface that enables the diagnostic tools 501-505 to register their implementing class for the dedicated interface. Some examples of these functionalities provided by way of the diagnostic interface 510 include getActivationLevel( ) Activate( ), Deactivate( ) and other functionalities. Generally, this interface layer 521 serves as a repository layer to identify available and connected diagnostic tools 501-505. Additionally, the interface layer 521 provides the interface methods or capabilities, which can be addressed and used by the diagnostic rule engine module 512.

The rule-based layer 522 includes the diagnostic rule engine module 512 that can receive rules at runtime through, for example, scripts, command line interfaces, or electronic documents (or rule documents 550-551). In one embodiment, the rules may be included in an electronic document. An electronic document generally refers to electronic media content that is accessible by computer technology. For example, an electronic document can be a file that is not an executable file or a system file and includes data for use by a computer program. Examples of electronic documents include a single or multiple files that are accessible by and/or associated with electronic document processing applications such as word processing applications, document viewers, email applications, spreadsheet applications, and other applications. Therefore, the electronic document may be composed of alphanumeric texts, symbols and other data. It should be appreciated that the electronic document can have a variety of file formats that, for example, may be identified by data within the electronic document and/or by the filename extension. Examples of electronic documents with different file formats include text documents, Hypertext Markup Language (HTML) documents, and Extensible Markup Language (XML) documents. As an example, the following Table A shows an XML format of a rule "When process type=batch && user='mustermann' && day=20091216 && time=&&2200

Then functional.trace.level=2," which activates some functional traces when a batch job getting executed for certain user account (user id: mustermann) at a certain time (on Sunday at 10:00 PM):

TABLE A

```
<rd-troubleshooting>
  <rd-condition>
    <process-type>batch</process-type>
    <user-session><user-id>mustermann</user-id></user-session>
    <day>20091216</day><time>2200</time>
  </rd-condition>
  <rd-action>
    <functional-trace><level>2</level></functional-trace>
  </rd-action>
</rd-troubleshooting>
```

It should be noted that the use of electronic documents to provide rules to a rule engine module, such as the diagnostic engine module 512, may facilitate the management of sets of rules because unique version names or numbers may be assigned to electronic documents.

These electronic documents with the rules (or rule documents 550-551) are interpreted and executed at runtime by the diagnostic rule engine module 512 on the basis of functionalities provided through the interface layer 521. Additionally, the rule documents 550-551 may be stored in a variety of locations depending on, for example, associated functionalities and activity ranges. Examples of locations where the rule documents 550-551 may be stored include a file system, a database, shared memory, or in a central or distributed registry. As an example, rule documents 550-551 used for diagnosing a Web server can be stored either in a file system or in a database. The deployment of the rule documents 550-551 in an ABAP Web Application server can be based on a database such that the rule documents 550-551 could be applied to all involved or available application server in a system if requested. The rule documents 550-551 could also be retrieved at runtime from the database and cached in the share memory to possibly accelerate, for example, access to the rule documents 550-551 document when multiple parties or processes (e.g., application server work processes) simultaneously access the rule documents 550-551.

Still referring to FIG. 5, in one example, the diagnostic-based system 500 may be embodied in an ABAP application server. As used in a software development environment, the development, function correctness tests, and error analysis can be executed together in parallel. To use the diagnostic-based system 500 for both development and function correctness tests (e.g., unit and verification tests and sandbox performance tests), the side effects of parallel execution should be reduced when performance tests are executed. The performance tests may be based on cleanroom or sandbox methodologies. The cleanroom methodology exclusively reserves an environment (e.g., a server) for performance measurements. The cleanroom methodology may provide absolute values regarding, for example, response times and overall performance results. The sandbox methodology allows parallel execution of activities and excludes activities that may have a negative influence on the execution. However, the sandbox methodology delivers relative results based on approximate comparisons of the performance results of different runs.

In an example using the cleanroom methodology for performance tests, cleanroom performance measurements are carried out by deactivation of all other activities in the diagnostic-based system 500 with the exception of performance runs. With the diagnostic rule engine module 512, rules may be defined to automatically execute functionalities for establishing an environment for cleanroom performance measurements. In one example, these functionalities may relate to the deactivation of performance degrading methods in a system. Here, all active users are informed about the performance measurements and automatically logged out. Subsequent logons to the system are prohibited for the duration of the measurement. All performance degrading tools (e.g., error analysis methods and planned jobs for the performance runs) are deactivated.

In another example, the functionalities relate to the deactivation of performance degrading methods on the ABAP application server. Here, all active users on that affected ABAP application server in a system of application servers are informed about the performance measurement runs and automatically logged out. Similarly, subsequent logons to the ABAP application server are prohibited for the duration of the measurement. All performance degrading tools on this ABAP application server are deactivated. The requests addressed to this ABAP application server are rerouted (e.g., by way of a load balancing infrastructure) to other application servers. The performance degrading tools can be deactivated temporarily (e.g., for a period to take the performance measurements), with the server load balancing groups removed.

In an example using the sandbox methodology, a more granular deactivation of performance degrading tools is used when compared with the cleanroom methodology. In an example where functionalities relate to the deactivation of performance degrading methods for a dedicated user account (e.g., a client and user), all sessions of the dedicated users in the system are informed about the performance measurements, and all performance degrading tools for the associated user account are deactivated. Furthermore, the deactivation of performance degrading tools can be applied to all derived sessions (e.g., remote function calls or HyperText Transfer Protocol (HTTP) calls) that originated from the same active session. In another example where functionalities relate to the deactivation of performance degrading methods for dedicated requests, all performance degrading tools during the performance runs for the dedicated request are deactivated. Again, the deactivation of performance degrading tools can be applied to all derived sessions that originated from the same active session.

In both cleanroom and sandbox methodologies, the diagnostic rule engine module 512 can receive rule documents 550 and 551 that include rules that specify the deactivation of all diagnostic tools 501-505 as soon as a request arrives in preparation for performance analysis. For example, if a request is received on the respective ABAP application server independently of the underlying communication layer (e.g., Remote Function Call (RFC), HTTP, and batch), the diagnostic rule engine module 512 checks the present status of the diagnostic tools 501-505 for this request. If any of the diagnostic tools 501-505 is active before the request is executed by the engine (compiler), the diagnostic tool 501, 502, 503, 504, or 505 is temporarily deactivated and the present state of the diagnostic tool 501, 502, 503, 504, or 505 is preserved (stacked). As soon the resource (e.g., work process) is not in use by that request, the previous preserved state is re-established for the processing of subsequent requests. If the diagnostic tools 501-505 are activated for a user or a request before the request is executed by the engine, then these diagnostic tools 501-505 are deactivated for this run. If further activities (e.g., asynchronous events) are triggered during a request, the present status of the diagnosis is passed on to subsequent actions. The reduction of possibly conflicting influences may, for example, facilitate the execution of different activities (e.g., development, tests, and performance analysis runs).

It should also be appreciated that one or more diagnostic tools 501-505 may be activated with a performance analysis tool. For example, the diagnostic tools 501-505 may be activated when the performance analysis tool is itself analyzed. Here, rules in the rule document 550-551 may enable the co-existence of several diagnostic tools 501-505. As discussed above, it should also be noted that performance-degrading diagnostic activities (e.g., tracing, logging, debugging, and memory analysis) should not be activated for a dedicated measurements run. Here, the ABAP application server can be adapted to deactivate the diagnostic tools 501-505 to avoid, for example, any unintended negative influence on the performance run.

Still referring to FIG. 5, the diagnostic-based system 500 may also be embodied within a virtual machine layer, in accordance with alternate embodiment. In a virtual machine layer, many programming languages, such as ABAP, provide functionalities for activation of debugger 504 (e.g., BREAK-POINT), activation of application log 501 (e.g., LOG-POINT), and also activating application programming interfaces for activating performance measurements. Accordingly, the functionalities may be defined in rules accordingly. Additionally, when an error occurs, in addition to processing and recording the dedicated error (e.g., short dumps in ABAP due to memory shortage as defined in, for example, CALL_FUNCTION_BLOB_NO_MEMORY, CALL_FUNCTION_TABLE_NO_MEMORY), additional memory analysis trace (e.g., top ten memory areas, internal tables, or the maintained memory size of sessions) can also be provided. The rules can also define the conditions of when and how this additional information can be provided.

Figure 6:
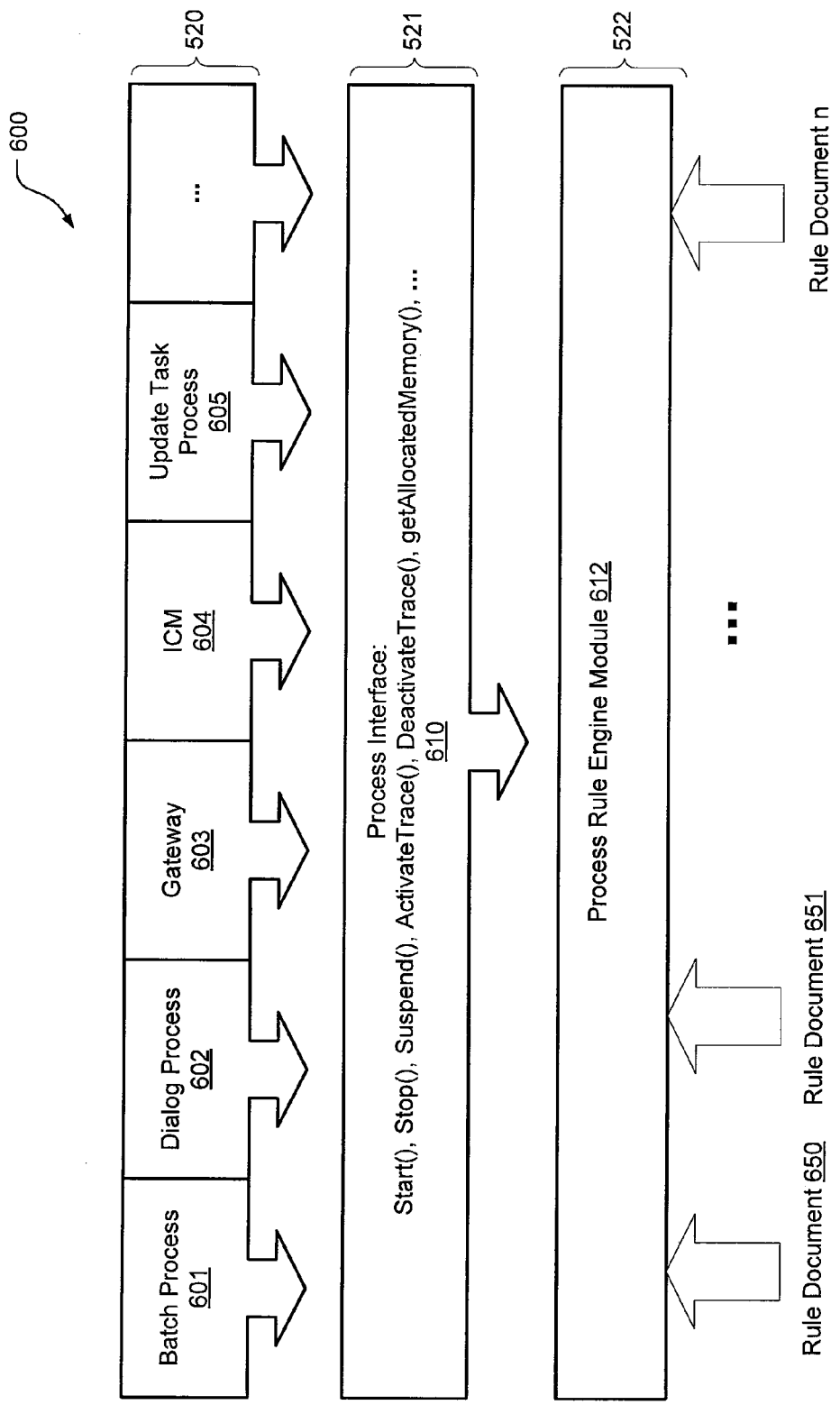
FIG. 6 depicts a block diagram of an architectural overview of a rule engine module embodied in a process-based system, in accordance with another embodiment.

FIG. 6 depicts a block diagram of an architectural overview of a rule engine module embodied in a process-based system 600, in accordance with another embodiment. The process-based system 600 also provides a three-tiered layering, which includes a component layer 520, an interface layer 521, and a rule-based layer 522. Similarly, this process-based system 600 may be embodied within, for example, an application server layer or a virtual machine layer. Here, the component layer 520 includes batch process 601, dialog process 602, gateway 603, Internet Communication Manager (ICM) 604, and update task process 605. The interface layer 521 includes a process interface 610. Some example functionalities provided by way of the process interface 610 include start( ) stop( ) suspend( ) activate trace( ) deactivate trace( ) getAllocatedMemory( ) and other functionalities. In this embodiment, the rule-based layer 522 includes a process rule engine module 612.

In the process-based system 600, the various components 601-605 and their operational behaviors can be automatically managed by the process rule engine module 612. In particular, the process rule engine module 612 can control process operations, software layers, layers, and schedulers, as defined by the rules in the rule documents 650-651. For example, many of these services (e.g. batch processes 601) can be disabled or enabled. In another example, resources (e.g., memory available for the user session or application server) can also be reduced or extended.

With the process rule engine module 612, a set of rule documents 650-651 in the form of templates can be applied for particular situations. For example, specific rule documents 650-651 related to customer support can be applied to support certain capabilities in a customer system to obtain, for example, additional information (e.g., activation of health checks of components 601-605 under certain circumstances). Additionally, the process rule engine module 612 also allows the deployment of rule documents 650-651 in a collection of computing devices within a system landscape to uniformly activate or deactivate certain capabilities.

Figure 7:
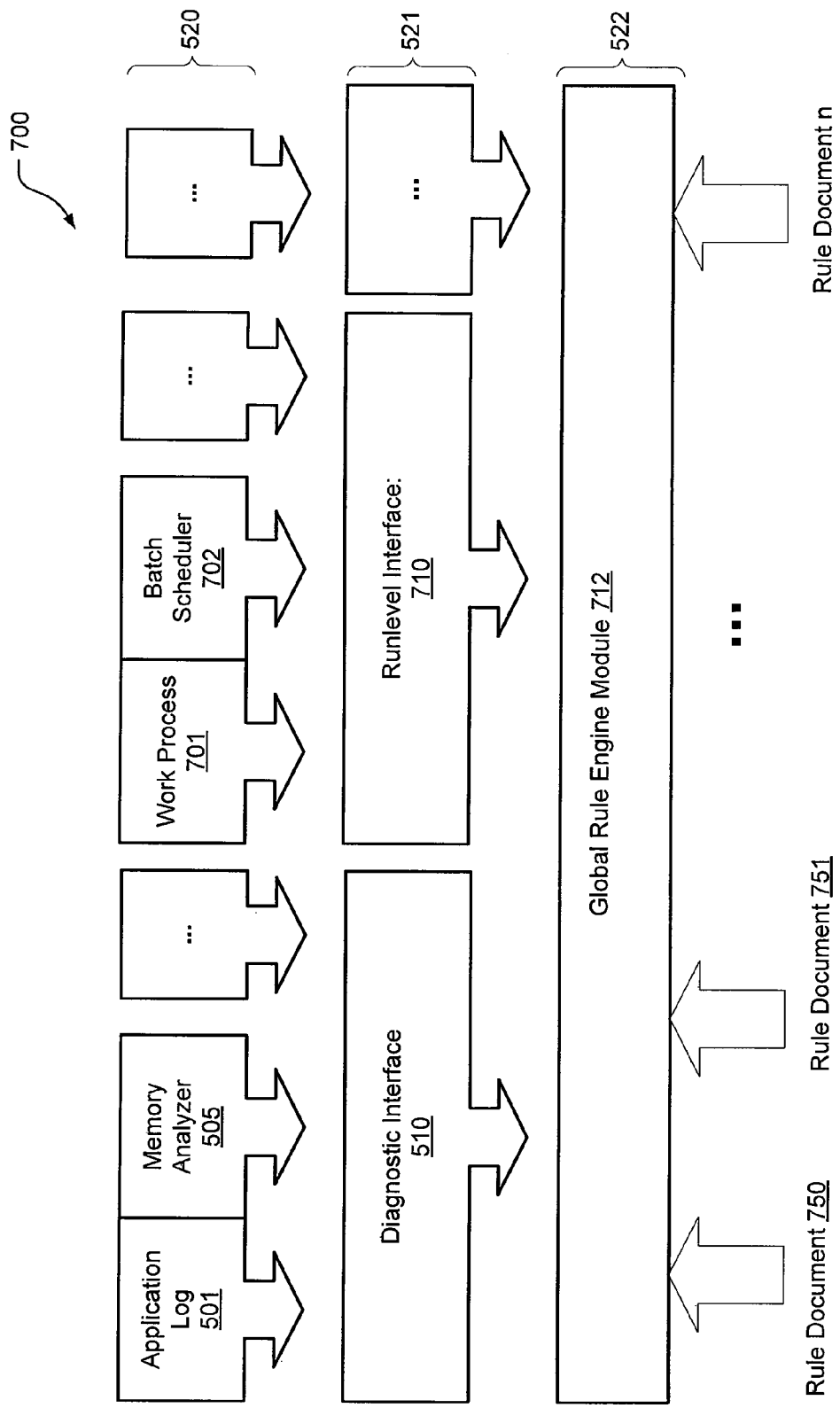
FIG. 7 depicts a block diagram of an architectural overview of a global rule engine module embodied in a global-based system, in accordance with an embodiment.

FIG. 7 depicts a block diagram of an architectural overview of a global rule engine module embodied in a global-based system 700, in accordance with an embodiment. The global-based system 700 also provides a three-tiered layering, which includes a component layer 520, an interface layer 521, and a rule-based layer 522. This process-based system 600 may be embodied within, for example, an application server layer, a virtual machine layer and/or an operating system layer.

Here, the interface layer 521 can address or include several interfaces. For example, as depicted in FIG. 7, the interface layer 521 includes a diagnostic interface 510 and a runlevel interface 710. Accordingly, the component layer 520 includes components 501, 505, 701, and 702 that map to the underlying diagnostic interface 510 and the runlevel interface 710. For example, the component layer 520 includes application log 501 and memory analyzer 505 that can interface with the diagnostic interface 510. Additionally, the component layer 520 also includes work process 701 and batch scheduler 702 that interface with the runlevel interface 710.

In this embodiment, the rule-based layer 522 may include a global rule engine module 712 that is adapted to execute all the functionalities associated with different rule-based engines, such as a diagnostic rule engine module and a runlevel rule engine module. Accordingly, the rules included in the rule documents 750-751 can define functionalities provided by different layers through different application programming interfaces, such as the diagnostic interface 510 and the runlevel interface 170.

Figure 8:
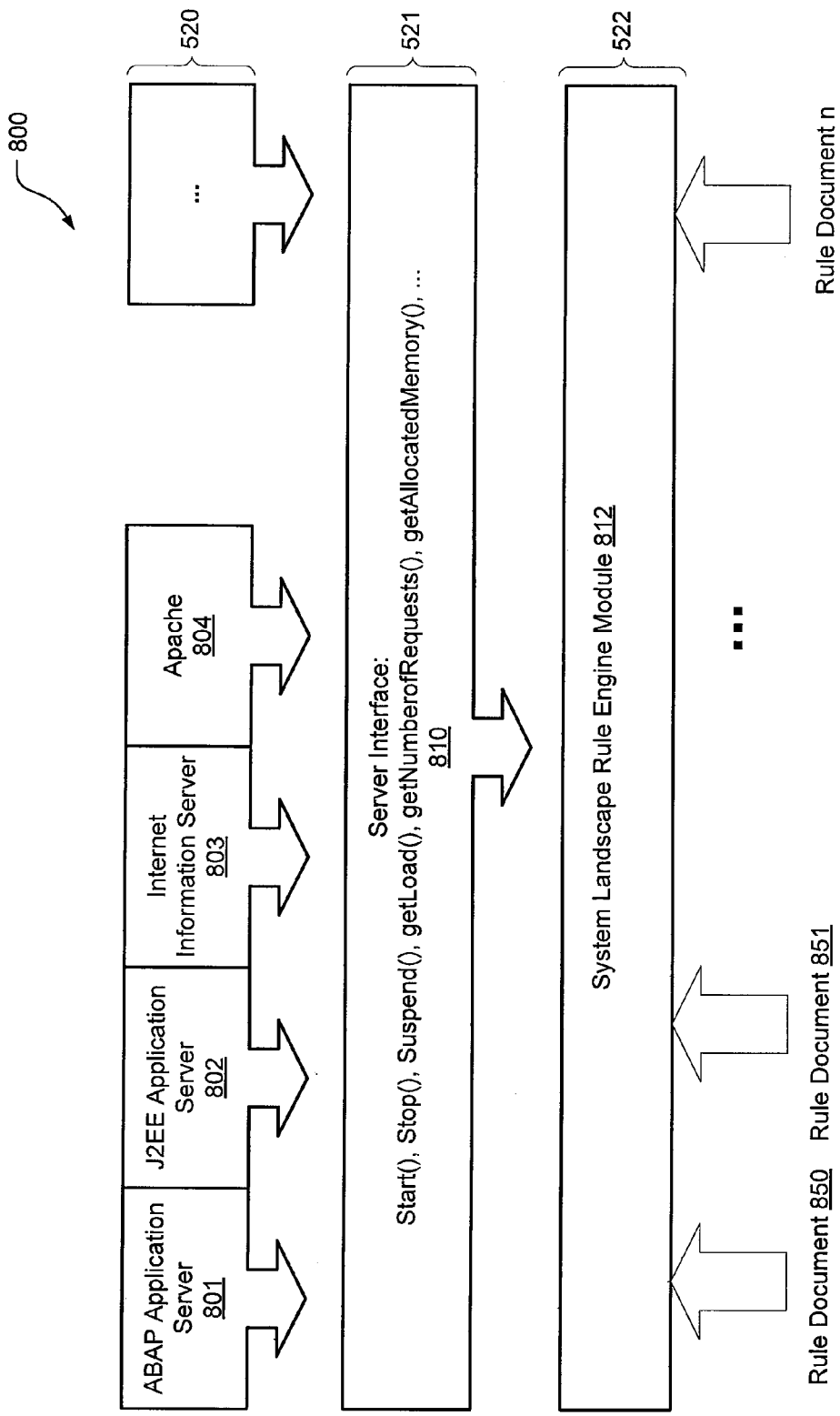
FIG. 8 depicts a block diagram of an architectural overview of a system landscape rule engine module embodied in a landscape-based system, in accordance with yet another embodiment.

FIG. 8 depicts a block diagram of an architectural overview of a system landscape rule engine module 812 embodied in a landscape-based system 800, in accordance with yet another embodiment. The landscape-based system 800 provides a three-tiered layering, which includes a component layer 520, an interface layer 521, and a rule-based layer 522. This landscaped-based system 800 may be embodied within, for example, an application server layer.

In this embodiment, the component layer 520 includes different types of servers, such as an ABAP application server 801, a J2EE application server 802, an Internet information server 803, and an Apache server 804. Here, the collection of application servers 801-804 within a system landscape can be controlled by a single rule-based engine, such as the system landscape rule engine module 812. Each server 801, 802, 803, or 804 can delegate its global functionalities to a server interface 810 included in the interface layer 521, and in turn, these functionalities are made available to the system landscape rule engine module 812. With the hierarchical layering 520-522, the system landscape rule engine module 812 can control application servers 801-804 and also indirectly influence the behavior of software processes. For example, rules included in the rule documents 850-851 can specify the deactivation of one or more application servers 801-804 when no activities on the application servers 801-804 take place or start one or more additional application servers 801-804 with an increase of load of certain application servers 801-804.

Figure 9:
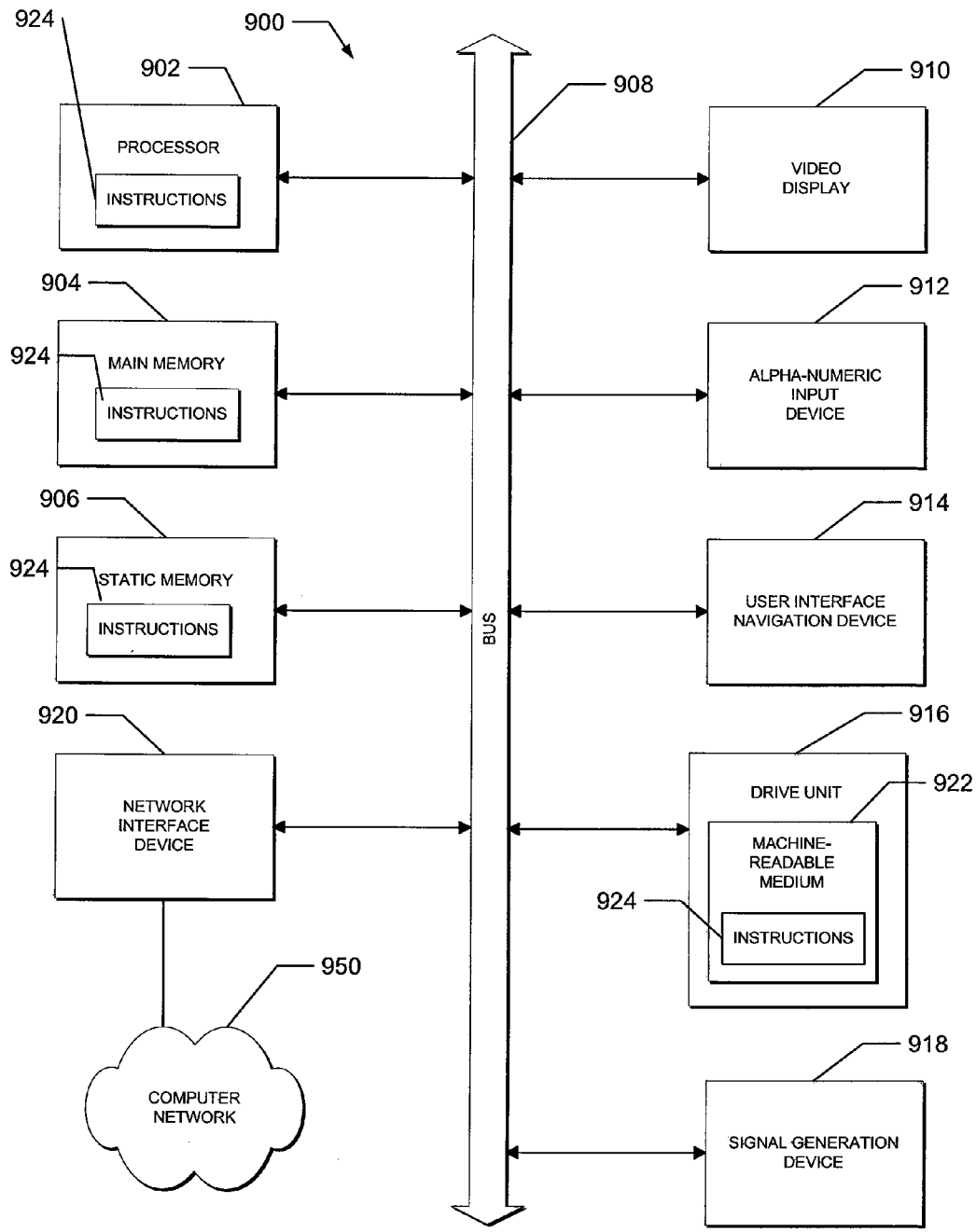
FIG. 9 depicts a block diagram of a machine in the example form of a computing device within which may be executed a set of instructions for causing the machine to perform any one or more of the methodologies discussed herein.

FIG. 9 depicts a block diagram of a machine in the example form of a computing device 900 within which may be executed a set of instructions for causing the machine to perform any one or more of the methodologies discussed herein. The computing device 900 may be deployed in the form of, for example, a personal computer, a laptop computer, a server computer, a tablet personal computer, a personal digital assistant, a mobile phone, or other computing devices. The machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 900 includes a processor 902 (e.g., a central processing unit (CPU), a microprocessor, a graphics processing unit (GPU), or both), a main memory 904 (e.g., random access memory (a type of volatile memory)), and static memory 906 (e.g., static random access memory (a type of volatile memory)), which communicate with each other via bus 908. The computing device 900 may further include video display unit 910 (e.g., a plasma display, a liquid crystal display (LCD) or a cathode ray tube (CRT)). The computing device 900 also includes an alphanumeric input device 912 (e.g., a keyboard), a user interface (UI)

navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by computing device 900, with the main memory 904 and processor 902 also constituting machine-readable, tangible media.

The data structures and instructions 924 may further be transmitted or received over a computer network 950 via network interface device 920 utilizing any one of a number of well-known transfer protocols (e.g., HTTP).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 900) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a processor 902 (e.g., a general-purpose processor) configured using software, the processor 902 may be configured as respective different hardware modules at different times. Software may accordingly configure the processor 902, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processor or processors 902 may be located in a single location (e.g., within a home environment, an office environment or as a server farm), while in other embodiments the processors 902 may be distributed across a number of locations.

While the embodiment(s) is (are) described with reference to various implementations and exploitations, it will be understood that these embodiments are illustrative and that the scope of the embodiments) is not limited to them. In general, techniques for processing rules may be implemented with facilities consistent with any hardware system(s) defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of processing a rule, the method comprising:
   within an application server layer,
      integrating a first rule engine within the application server layer to have the first rule engine access and execute functionalities provided by the application server layer and by the first rule engine;

receiving a first rule at runtime of the application server layer, the first rule defining a first condition and a first functionality associated with the first condition, the first functionality being provided by the application server layer;

identifying, using a microprocessor, fulfillment of the first condition;

executing the first functionality with the first rule engine based on the identification of the fulfillment of the first condition, and within an operating system layer, integrating a second rule engine within the operating system layer to have the second rule engine access and execute functionalities provided by the operating system layer and by the second rule engine;

receiving a second rule at runtime of the operating system layer, the second rule defining a second condition and a second functionality associated with the second condition, the second functionality being provided by the operating, system layer;

identifying, using the microprocessor, fulfillment of the second condition; and executing the second functionality with the second rule engine based on the identification of the fulfillment of the second condition.

2. The method of claim 1 further comprising:

within a virtual machine layer, integrating a third rule engine within the virtual machine layer to have the third rule engine access and execute functionalities provided by the virtual machine layer and by the third rule engine;

receiving a third rule at runtime of the virtual machine layer, the third rule defining a third condition and a third functionality associated with the third condition, the third functionality being provided by the virtual machine layer;

identifying, using the microprocessor, fulfillment of the third condition; and executing the third functionality with the third rule engine based on the identification of the fulfillment of the third condition.

3. The method of claim 2, wherein the application server layer is adapted to host an additional application that is accessible by a computing device in communication with the application server layer through an application programming interface.

4. The method of claim 1, further comprising:

identifying an occurrence of an event, wherein the identification of the fulfillment of the first condition is based on the occurrence of the event and wherein the execution of the first functionality comprises activating a diagnostic tool.

5. The method of claim 4, wherein the diagnostic tool includes at least one of a debugger, a memory analyzer, a tracing tool, an application log, a security monitor, a performance monitor, or a configuration monitor.

6. The method of claim 1, further comprising:

identifying a non-occurrence of an event, wherein the identification of the fulfillment of the first condition is based on the non-occurrence of the event and the execution of the first functionality comprises deactivating a diagnostic tool.

7. The method of claim 1, further comprising:

identifying an occurrence of an event, wherein the identification of the fulfillment of the first condition is based on the occurrence of the event and wherein the execution of the first functionality comprises activating a process.

8. The method of claim 7, wherein the process includes at least one of a batch process, a dialog process, or an update task process.

9. The method of claim 1, further comprising:

identifying a non-occurrence of an event, wherein the identification of the fulfillment of the first condition is based on the non-occurrence of the event and the execution of the first functionality comprises deactivating a process.

10. The method of claim 1, wherein the application server layer provides the first functionality through an application programming interface.

11. The method of claim 1, wherein the rule is included in an electronic document.

12. The method of claim 10, wherein the electronic document is an Extensible Markup Language (XML) document.

13. A computing device comprising:

at least one microprocessor; and a memory in communication with the at least one microprocessor, the memory being configured to store a first rule engine module integrated within an application server layer that is executable by the at least one microprocessor to have the first rule engine access and execute functionalities provided by the application server layer and by the first rule engine, the first rule engine module having instructions that when executed by the at least one microprocessor, cause operations to be performed, the operations comprising:

receiving a first rule at runtime of the application server layer, the first rule defining a first condition and defining a first functionality associated with the first condition;

identifying fulfillment of the first condition;

executing the functionality with the first rule engine based on the identification of the fulfillment of the first condition;

the memory being configured to further store a second rule engine module integrated within an operation system layer that is executable by the at least one microprocessor to have the second rule engine access and execute functionalities provided by the operating system layer and by the second rule engine, the second rule engine module having instructions that when executed by the at least one microprocessor, cause operations to be performed, the operations comprising;

receiving a second rule at runtime of the application server layer, the second rule defining a second condition and defining a second functionality associated with the second condition;

identifying fulfillment of the second condition;

executing the functionality with the second rule engine based on the identification of the fulfillment of the second condition.

14. The computing device of claim 13, wherein the memory is further configure to store a third rule engine integrated within a virtual machine layer to have the third rule engine access and execute functionalities provided by the virtual machine layer and by the third rule engine, the third rule engine module having instructions that when executed by the at least one microprocessor, cause operations to be performed, the operations comprising:

receiving a third rule at runtime of the virtual machine layer, the third rule defining a third condition and defining a third functionality associated with the third condition;

identifying fulfillment of the third condition; and executing the functionality with the third rule engine based on the identification of the fulfillment of the third condition.

15. The computing device of claim 14 wherein the virtual machine layer is adapted to interpret binary code for execution by the at least one microprocessor.

16. The computing device of claim 13, wherein the memory is further configured to store an application programming interface, and wherein the functionality is provided through the application programming interface.

17. A non-transitory machine-readable medium that stores instructions, which, when performed by a machine, cause the machine to perform operations comprising;

within an application server layer, integrating a first rule engine within the application server layer to have the first rule engine access and execute functionalities provided by the application server layer and by the first rule engine;

receiving a first rule at runtime of the application server layer, the first rule defining a first condition and a first functionality associated with the first condition, the first functionality being provided by the application server layer;

identifying, using a microprocessor, fulfillment of the first condition;

executing the first functionality with the first rule engine based on the identification of the fulfillment of the first condition, and within an operating system layer, integrating a second rule engine within the operating system layer to have the second rule engine access and execute functionalities provided by the operating system layer and by the second rule engine;

receiving a second rule at runtime of the operating system layer, the second rule defining a second condition and a second functionality associated with the second condition, the second functionality being provided by the operating system layer;

identifying, using the microprocessor, fulfillment of the second condition; and executing the second functionality with the second rule engine based on the identification of the fulfillment of the second condition.

18. The machine-readable medium of claim 17, wherein the operations further comprise detecting an occurrence of an event, wherein the operation of identifying the fulfillment of the first condition is based on the occurrence of the event, and wherein the operation of executing the first functionality comprises deactivating a diagnostic tool.

19. The machine-readable medium of claim 17, wherein the operations further comprise detecting a non-occurrence of an event, wherein the operation of identifying the fulfillment of the first condition is based on the non-occurrence of the event, and wherein the operation of executing the functionality comprises activating a diagnostic tool.

20. The machine-readable medium of claim 17, wherein a third functionality is provided by a virtual machine layer.

* * * * *